(12) United States Patent
Hsin

(10) Patent No.: US 6,831,803 B2
(45) Date of Patent: Dec. 14, 2004

(54) REPEATABLE RUNOUT IDENTIFICATION DEVICE AND METHOD

(75) Inventor: Yi-Ping Hsin, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 231 days.

(21) Appl. No.: 10/180,077

(22) Filed: Jun. 26, 2002

(65) Prior Publication Data

US 2003/0184908 A1 Oct. 2, 2003

Related U.S. Application Data

(60) Provisional application No. 60/369,083, filed on Apr. 1, 2002.

(51) Int. Cl.$^7$ ............................................. G11B 5/596
(52) U.S. Cl. .................................................... 360/77.04
(58) Field of Search ............................. 360/77.04, 75, 360/77.02, 77.08

(56) References Cited

U.S. PATENT DOCUMENTS

| | | |
|---|---|---|
| 4,135,217 A | 1/1979 | Jacques et al. |
| 5,444,583 A | 8/1995 | Ehrlich et al. |
| 5,585,976 A | 12/1996 | Pham |
| 5,646,797 A | 7/1997 | Kadlec et al. |
| 5,680,272 A | 10/1997 | Kadlec et al. |
| 5,684,650 A | 11/1997 | Kadlec et al. |
| 5,854,722 A | 12/1998 | Cunningham et al. |
| 5,867,340 A | 2/1999 | Morehouse et al. |
| 5,886,846 A | 3/1999 | Pham et al. |
| 5,949,605 A | 9/1999 | Lee et al. |
| 6,049,440 A | 4/2000 | Shu |
| 6,069,794 A | 5/2000 | Morris et al. ............. 360/77.04 |
| 6,115,203 A * | 9/2000 | Ho et al. .................. 360/77.04 |
| 6,141,175 A * | 10/2000 | Nazarian et al. ......... 360/77.04 |
| 6,449,116 B2 * | 9/2002 | Morris et al. ............. 360/77.04 |
| 6,545,835 B1 * | 4/2003 | Codilian et al. .......... 360/77.04 |
| 6,549,362 B1 * | 4/2003 | Melrose et al. .......... 360/77.04 |

OTHER PUBLICATIONS

Yi–Ping Hsin, "Written–In Repeatable Run–Out Compensation in Embedded Servo Disc Drives," Dec. 12, 2001, U.S. patent application No. 10/017,930.

Zhang et al., "Real–Time Automatic Loop Sharing for a Disc Drive Servo Control System," Jun. 29, 2001, U.S. patent application No. 09/896,895.

* cited by examiner

*Primary Examiner*—David Hudspeth
*Assistant Examiner*—James L Habermehl
(74) *Attorney, Agent, or Firm*—Westman, Champlin & Kelly (57) ABSTRACT

A repeatable runout (RRO) identification device for use with a disc drive having a rotatable disc is provided. The RRO identification device determines RRO values for servo fields of a first track of the disc as a function of received position error signal (PES) values for the servo fields independent of averaging the PES values for each servo field. The RRO identification device compares, in real-time, each determined RRO value for each servo field with a threshold repeatable runout value.

20 Claims, 10 Drawing Sheets

REPEATABLE RUNOUT IDENTIFICATION DEVICE AND METHOD

CROSS-REFERENCE TO RELATED APPLICATION

This application claims priority from U.S. Provisional Application 60/369,083 filed on Apr. 1, 2002 for inventor Yi-Ping Hsin and entitled "REPEATABLE RUNOUT IDENTIFICATION DEVICE USED IN FACTORY ZAP PROCESS".

FIELD OF THE INVENTION

The present invention relates generally to servo systems in disc drives. In particular, the present invention relates to compensation for errors in servo systems.

BACKGROUND OF THE INVENTION

Disc drives read and write information along concentric tracks formed on discs. To locate a particular track on a disc, disc drives typically use embedded servo fields on the disc. These embedded fields are utilized by a servo subsystem to position a head over a particular track. The servo fields are written onto the disc when the disc drive is manufactured and are thereafter simply read by the disc drive to determine position.

Ideally, a head following the center of a track moves along a perfectly circular path around the disc. However, two types of errors prevent heads from following this ideal path. The first type of error is a written-in error that arises during the creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path.

The second type of error that prevents circular paths is known as a track following error. Track following errors arise as a head attempts to follow the path defined by the servo fields. The track following errors can be caused by the same aerodynamic and vibrational effects that create written-in errors. In addition, track following errors can arise because the servo system is unable to respond fast enough to high frequency changes in the path defined by the servo fields.

Written-in errors are often referred to as repeatable runout (RRO) errors because they cause the same errors each time the head passes along a track. In general, the position of each servo field has a RRO error. During disc drive manufacture, a correction or compensation table, which includes a series of compensation values for RRO errors in positions of embedded servo fields, is calculated and stored. During subsequent normal operation of the disc drive by the user, the correction or compensation table is used by the servo control loop to improve the alignment of the head over a selected user track.

The compensation values for RRO errors are typically determined during disc drive manufacture through known Zero Acceleration Path (ZAP) compensation schemes. In general, these schemes carry out multiple iterations of RRO measurements for each track. Each iteration involves the averaging of position error signal (PES) values for servo fields of the respective track over multiple disc revolutions to determine RRO values, which are then compared with a preset RRO threshold. Determining RRO values for comparison with a preset RRO threshold by utilizing such an off-line process, which involves collecting PES values over multiple disc revolutions to determine RRO values, is time consuming and a barrier to economical, rapid mass production of disc drives. In this context, an off-line process is one in which the RRO values are not determined continuously or in "real-time," but instead are determined only after collecting PES values over multiple disc revolutions.

Embodiments of the present invention provide solutions to these and other problems, and offer other advantages over the prior art.

SUMMARY OF THE INVENTION

The present embodiments relate to a repeatable runout (RRO) identification scheme that is capable of measuring a RRO value of each servo field of a track and comparing the respective measured RRO value with a preset RRO threshold in real-time, thereby addressing the above-mentioned problems.

A RRO identification device for use with a disc drive having a rotatable disc is provided. The RRO identification device determines RRO values for servo fields of a first track of the disc as a function of received PES values for the servo fields independent of averaging the PES values for each servo field. The RRO identification device compares, in real-time, each determined RRO value for each servo field with a threshold repeatable runout value.

Other features and benefits that characterize embodiments of the present invention will be apparent upon reading the following detailed description and review of the associated drawings.

BRIEF DESCRIPTION OF THE DRAWINGS

FIG. 3-1 is a simplified block diagram of a disc drive servo loop coupled to a RRO identification device of the present invention.

FIG. 3-2 is a flow diagram of an example ZAP process with which the RRO identification device of the present invention is useful.

FIG. 3—3 is a simplified block diagram of an embodiment of a RRO identification device of the present invention.

FIG. 3–4 is a flow diagram of a RRO checking module of the RRO identification device of FIG. 3—3.

FIG. 3–5 is a flow diagram of another example ZAP process with which the RRO identification device of the present invention is useful.

DETAILED DESCRIPTION OF ILLUSTRATIVE EMBODIMENTS

Figure 1:
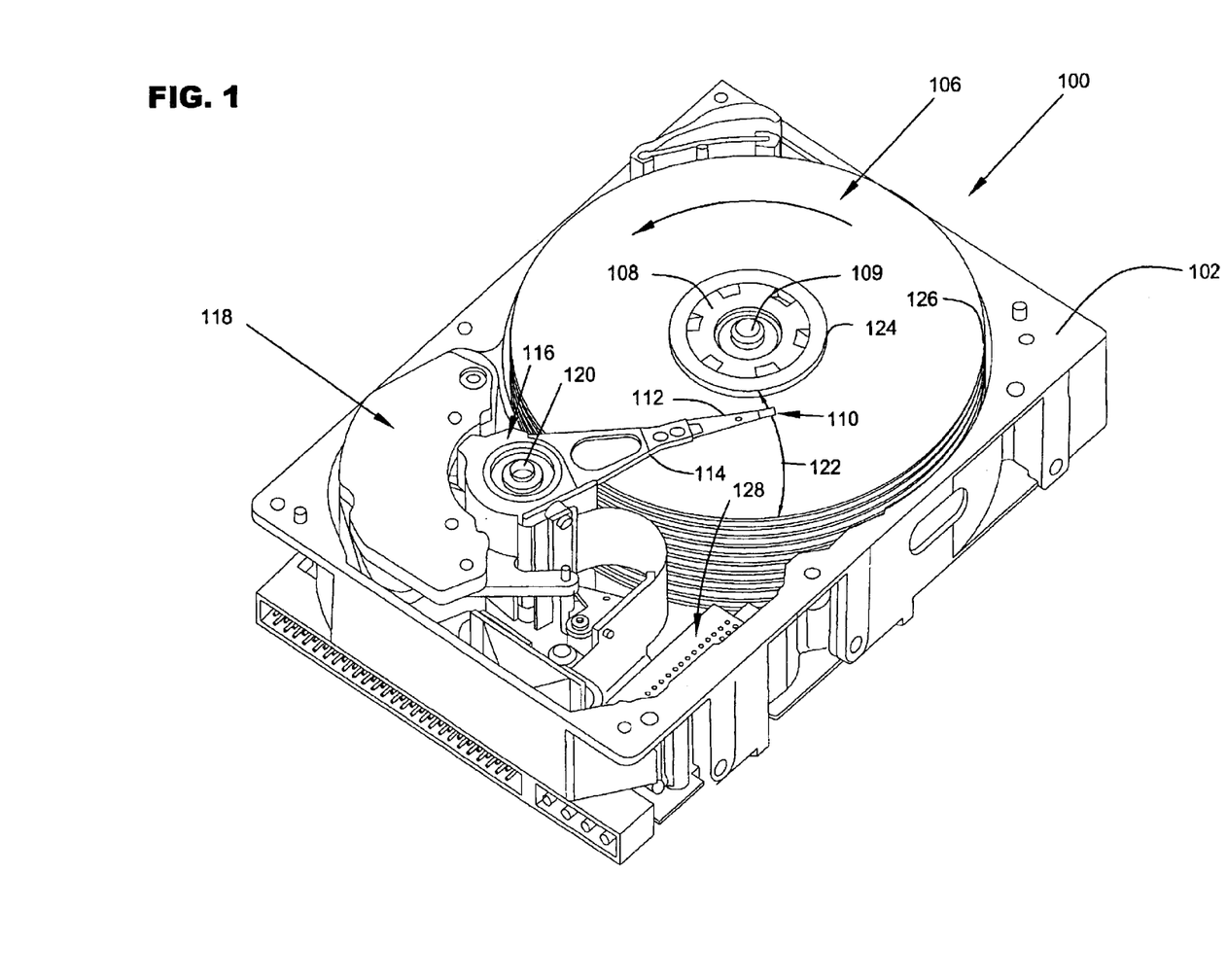
FIG. 1 is a perspective view of a head-disc assembly (HDA) with which the present invention is useful.

Referring now to FIG. 1, a perspective view of a magnetic disc drive, head disc assembly (HDA) 100 in accordance with the present invention is shown. The same reference numerals are used in the various figures to represent the same or similar elements. HDA 100 includes a housing with a base 102 and a top cover (not shown). HDA further includes a disc pack 106, which is mounted on a spindle motor (not shown) by a disc clamp 108. Disc pack 106 includes a plurality of individual discs which are mounted for co-rotation about central axis 109.

Each disc surface has an associated slider 110 which is mounted in HDA 100 and carries a read/write head for communication with the disc surface. In the example shown in FIG. 1, sliders 110 are supported by suspensions 112 which are in turn supported by track accessing arms 114 of an actuator 116. The actuator shown in FIG. 1 is of the type known as a rotary moving coil actuator and includes a voice coil motor (VCM), shown generally at 118. Other types of actuators can be used, such as linear actuators.

Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under the control of a closed-loop servo controller within internal circuitry 128 based on position information, which is stored on one or more of the disc surfaces within dedicated servo fields. The servo fields can be interleaved with data sectors on each disc surface or can be located on a single disc surface that is dedicated to storing servo information. As slider 110 passes over the servo fields, the read/write head generates a readback signal that identifies the location of the head relative to the center line of the desired track. Based on this location, actuator 116 moves suspension 112 to adjust the head's position so that it moves toward the desired position. Once the transducing head is appropriately positioned, servo controller 128 then executes a desired read or write operation.

Figure 2:
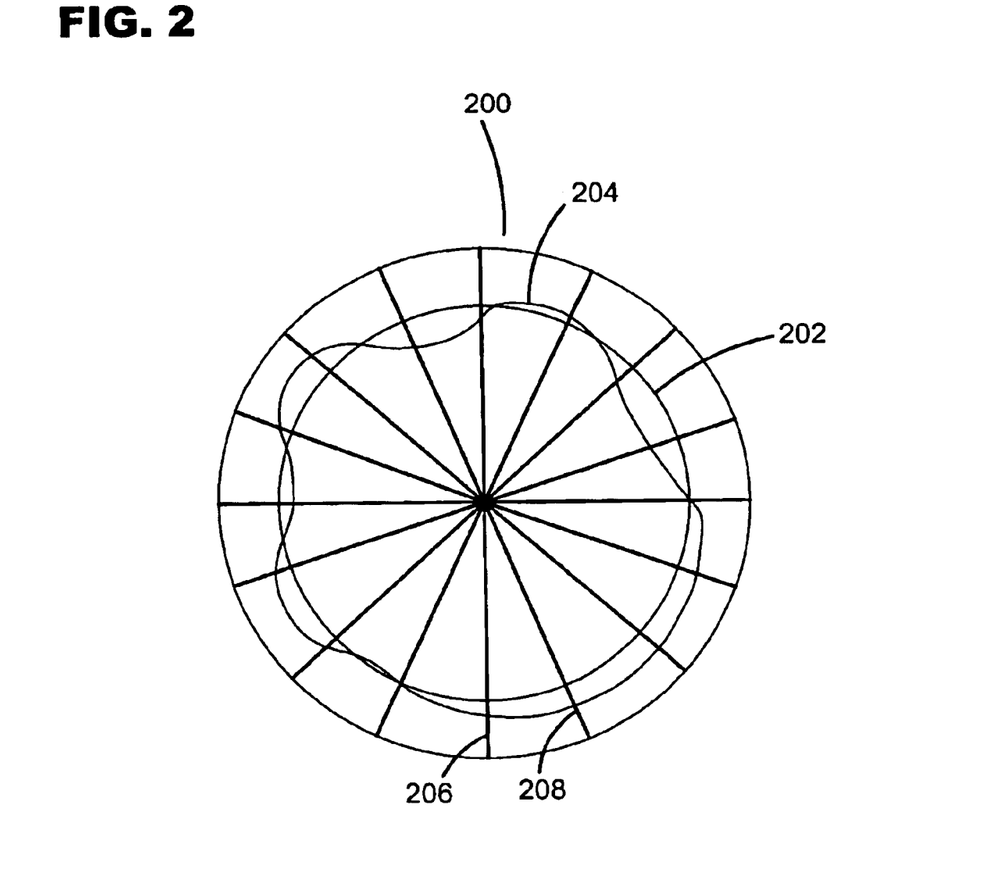
FIG. 2 is a top view of a section of a disc showing an ideal track and a realized written-in track.

Referring now to FIG. 2, a top view of a section 200 of a disc with an ideal, perfectly circular track 202 and an actual track 204 is shown. Section 200 includes a plurality of radially extending servo fields such as servo fields 206 and 208. The servo fields include servo information that identifies the location of actual track 204 along disc section 200.

Any variation in the position of a head away from circular track 202 is considered a position error. The portions of track 204 that do not follow circular track 202 create written-in repeatable runout (RRO) position errors. A position error is considered a RRO error if the same error occurs each time the head passes a particular circumferential location on the disc. Track 204 creates RRO errors because each time a head follows the servo fields that define track 204, it produces the same position errors relative to ideal track 202.

As mentioned above, a RRO correction or compensation table, which is calculated and stored during disc drive manufacture using any known ZAP compensation scheme, is used to improve the alignment of the head over a selected track during disc drive operation. Such ZAP compensation schemes typically carry out multiple iterations of RRO measurements for each track. Each iteration is relatively time consuming because it involves the determination of current iteration RRO values as a function of position error signal (PES) values collected over several disc revolutions, followed by an off-line comparison of the current iteration RRO values with a preset RRO threshold.

Under the present invention, a RRO value corresponding of each servo field of a track is measured and compared with a preset RRO threshold in real-time by an RRO identification device. As soon as all RRO values for a track are found to be below the preset threshold, the RRO identification device instructs the RRO compensation or ZAP process to advance to the next track, thereby reducing the time required to carry out each iteration of the ZAP process.

Figure 31:
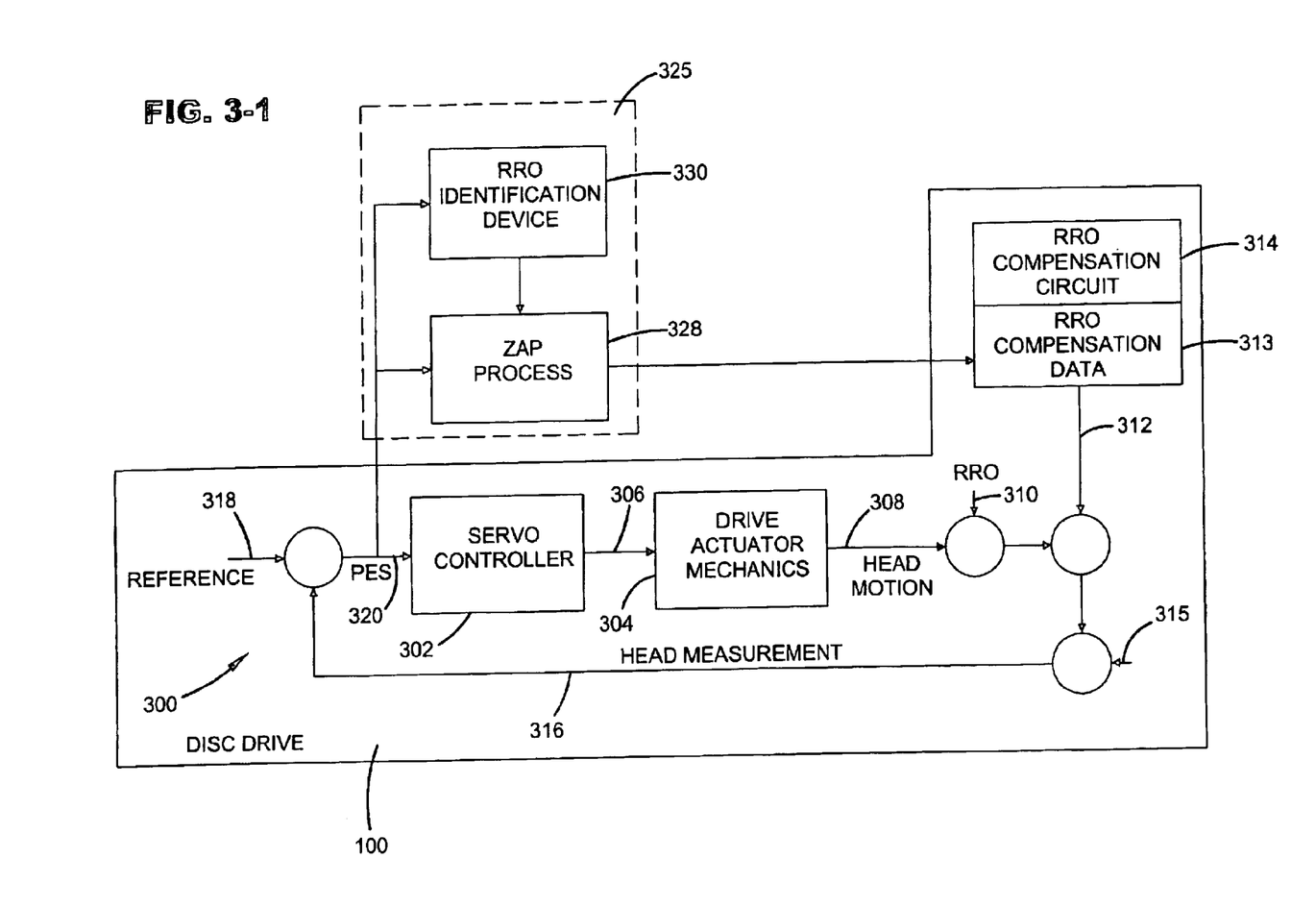

Referring now to FIG. 3-1, a simplified block diagram of a servo loop 300 of a disc drive 100 connected to a manufacturing system 325, which includes a ZAP process module 328 and a RRO identification device 330 of the present invention, is shown. Servo loop 300 includes servo controller 302 and disc drive actuator mechanics 304. Servo controller 302 is the servo controller circuitry within internal circuit 128 of FIG. 1. Drive actuator mechanics 304 includes actuator assembly 116, voice coil motor 118, track accessing arm 114, suspension 112, and sliders 110, all of FIG. 1.

Servo controller 302 generates a control current 306 that drives the voice coil motor of drive actuator 304. In response, the drive actuator 304 produces head motion 308. In FIG. 3-1, the RRO error is represented as a separate input signal 310 even though the RRO would otherwise appear implicitly in head motion 308. The separation of RRO from head motion 308 provides a better understanding of the present invention. An RRO compensation signal 312, which is produced from RRO compensation data 313 by RRO compensation circuit 314, is added to servo loop 300. In addition, noise in the servo system has been separated and appears as noise 315, which is added to the control signal. The combination of these signals results in the head's servo measurement signal, represented by reference numeral 316. Servo measurement signal 316 is subtracted from a reference signal 318, which is generated by internal circuitry 128 based on a desired location of the head. Subtracting head measurement 316 from reference signal 318 produces PES 320, which is input to servo controller 302.

Figure 32:
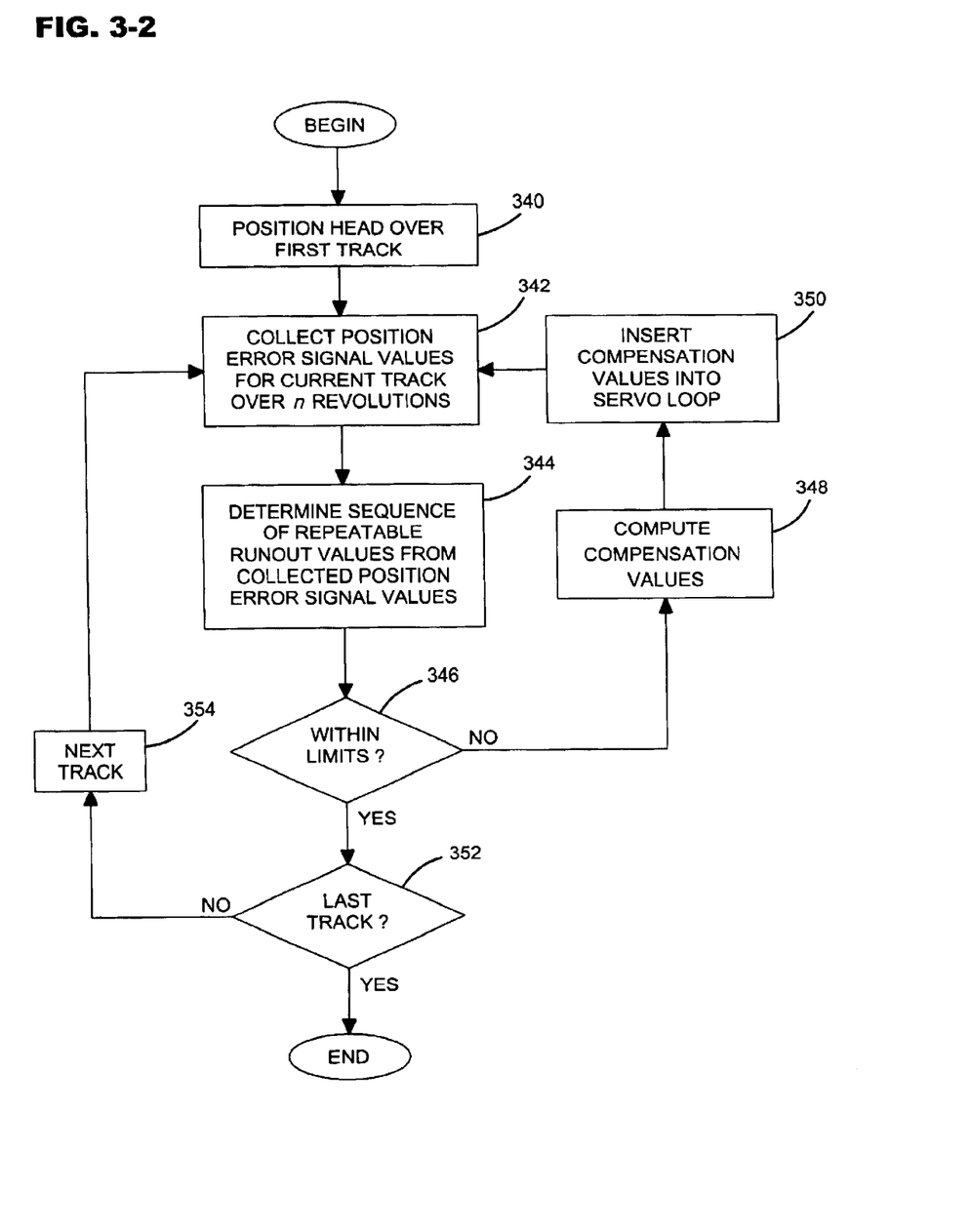
Figure 33:
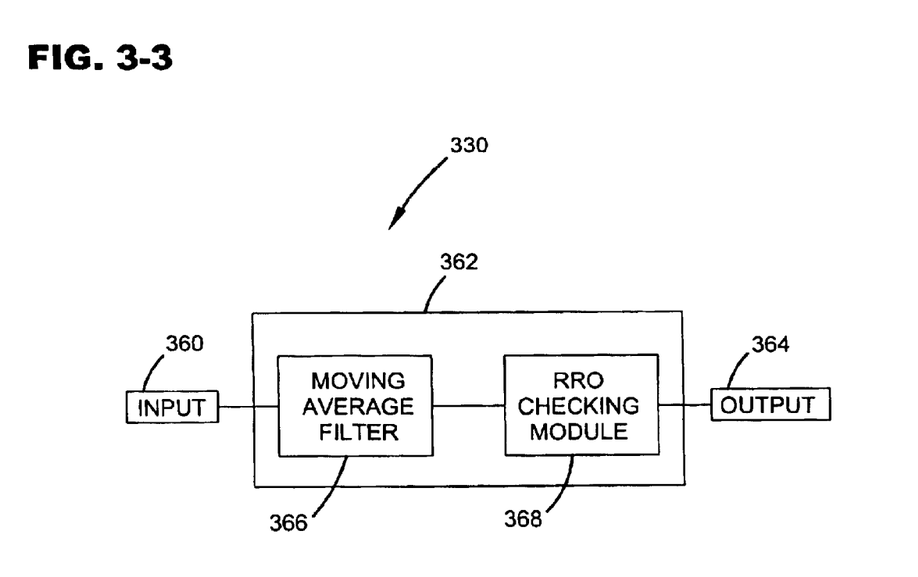

During disc drive manufacture, RRO compensation data 313 is produced by ZAP process 328, which is coupled to RRO identification device 330 of the present invention. An example ZAP process and the operation of RRO identification device 330 in conjunction with the example ZAP process is described below in connection with FIGS. 3-2 and 3—3.

Referring now to FIG. 3-2, a flow diagram of an example ZAP process with which the RRO identification device of the present invention is useful is shown. A first step 340 in this process is to instruct servo controller 302 to position the head over an initial or first track of a disc of drive 100. Once the head is positioned at the first track, the iterative process for calculating RRO compensation values begins at step 342. At step 342, PES values are collected for each servo field of the current track, which in this case is the first track, over several disc revolutions (for example, the number of disc revolutions n=5). At the end of n disc revolutions, a sequence of RRO error values for each servo field of the current track are computed at step 344 of this process. At step 346, the RRO values are compared with a preset RRO threshold value, which is typically a fraction of track pitch (for example, 4% of track pitch). If at least one RRO value is above the RRO threshold value, compensation values for the RRO error values are calculated and stored as part of RRO compensation data 313 at step 348. At step 350, these compensation values are injected into servo loop 300. Steps 342, 344, 346, 348 and 350 repeat such that the RRO compensation values for the track grow until they reach values that cause the RRO values to be within the limits set by step 346. If all RRO values for a track are found to be within limits set by step 346, the process advances to step 352 where it determines if the current track is the last track. At this step the ZAP process ends if the current track is the last track. If the last track is not encountered, the process advances to the next track at step 354. Control then passes back to step 342.

In the ZAP process described above, for any iteration carried out for a track, the PES values are always calculated over n disc revolutions at step 342 before the RRO values are determined at step 344 and compared against a preset RRO threshold at step 346. Thus, even if the compensation values injected into the servo loop at step 350 cause all the RRO values of the current track to fall below the preset RRO threshold at any time between the first and the $(n-1)^{th}$ revolution, the process still continues until n disc revolutions are completed for the current iteration at step 342. Therefore, if n=5, for example, and if all RRO values for the current track are below the threshold RRO value at any time between the first and the fourth revolution, all five revolutions still have to be completed before the comparison between the RRO values and the threshold RRO value is carried out. Since the disc surface comprises approximately 30,000 tracks, these additional revolutions, which occur at every track, significantly increase the ZAP processing time for the drive. The ZAP process of FIG. 3-2 is a batch-type or off-line type ZAP process since the RRO measurements are not carried out in real-time, but instead are carried out for each track only after the completion of n revolutions of the disc. The RRO identification device of the present invention, described below in connection with FIG. 3—3, addresses this problem.

Referring now to FIG. 3—3, a simplified block diagram of RRO identification device 330 is shown. RRO identification device 330 includes an input 360, a processing circuit 362 and an output 364. Processing circuit 362 includes a moving average filter 366 and an RRO checking module 368. Input 360, which may be a software function, for example, receives a continuous stream of PES values 320 from servo loop 300. A PES value for a servo field is received when the head encounters the servo field. Thus, at each time step (time that elapses between the detection of adjacent servo fields of a track by the head) a PES value for a different servo field is received by input 360. Each PES value received by input 360 is utilized by moving average filter 366, which determines an RRO value for a respective servo field at each time step. Also, at each time step, RRO checking module 368 compares the RRO value for the different servo field with a threshold RRO value. As mentioned above, the threshold RRO value is typically a fraction of track pitch (for example, 4% of track pitch). When RRO checking module 368 determines that RRO values corresponding to all servo fields of a particular track are below the RRO threshold, control passes to output 364. Output 364 then instructs a RRO compensation or ZAP process to advance to a next track of the disc. Output 364 may be a software update function that changes a status flag in a memory register that is used by the ZAP process to determine if it should advance to the next track. Thus, receiving a PES value for a particular servo field of a track, computing the RRO value corresponding to the servo field and comparing the RRO value with a preset RRO threshold value, all occur at the same time step. Further, as soon as all RRO values for all servo fields of the track are found to be below the threshold RRO value, the ZAP process is instructed to advance to the next track. Thus, when RRO identification device 330 is used in conjunction with ZAP process 328 the ZAP compensation table for the disc is computed in a relatively short period of time. Details of the operation of moving average filter 366 are provided below in connection with Equations 1 and 2.

The transfer function of moving average filter 366 in the z-domain is represented as:

$$M(z) = \frac{1}{n}(1 + z^{-p} + z^{-2p} + \Lambda + z^{-(n-1)p}) \qquad \text{Equation 1}$$

where p is the number of servo fields of each track, and n corresponds to the number of revolutions used by a ZAP process for averaging PES values which are used to extract RRO measurements. As mentioned above, the moving average filter generates an RRO value at each time step. From Equation 1, it follows that the RRO value at the current time step k is the convolution sum of the PES and the moving average filter transfer function in the time domain, m(k), and can be represented by:

$$RRO(k) = PES(k) * m(k) \qquad \text{Equation 2}$$
$$= \frac{1}{n}[PES(k) + PES(k-p) + \Lambda + PES(k-(n-1)p)]$$

Figure 34:
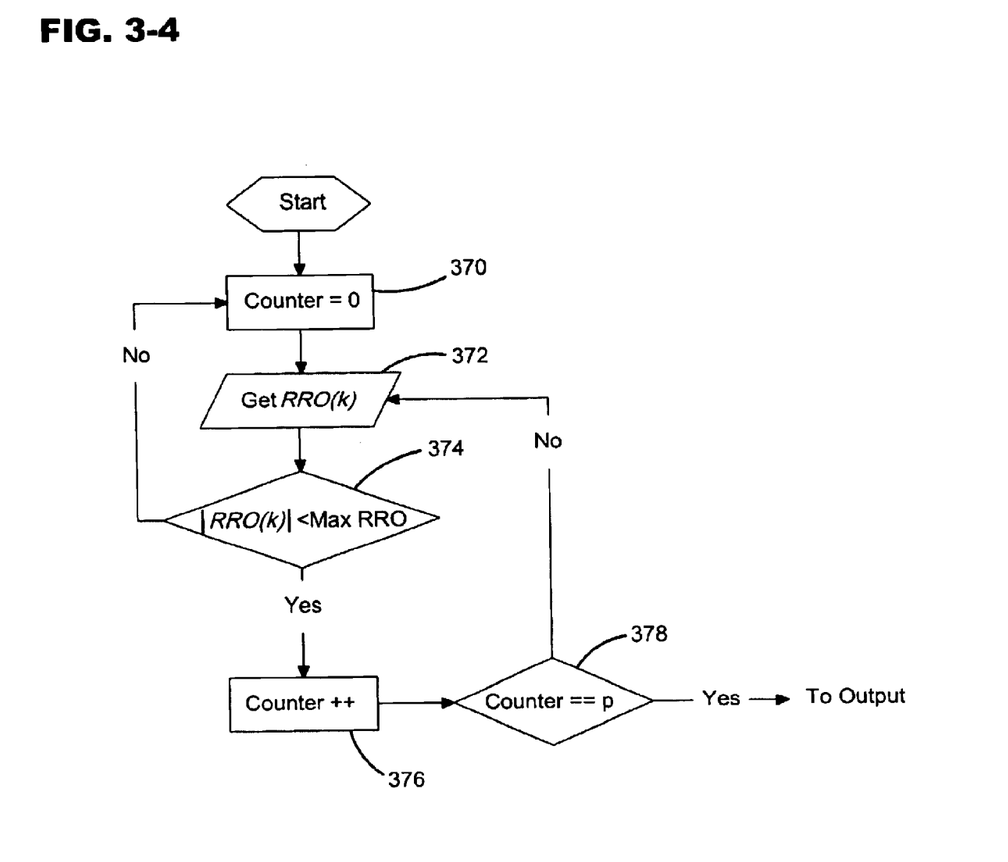

From Equation 2 it is clear that the current RRO value RRO(k) at a certain servo field is a function of the average of the most recent n revolutions of PES values at the same servo field. Thus, the RRO values are measured in a manner similar to that described above in connection with the ZAP process of FIG. 3-2, with the only difference being that instead of computing the RRO values of all servo fields at once (see FIG. 3-2 steps 342 and 344), the real-time moving average filter generates an RRO value for a certain servo field at every time step. As mentioned above, an RRO value generated by moving average filter 366 is also received and processed by RRO checking module 368 at each time step. The operation of RRO checking module 368 is described in connection with FIG. 3–4 below.

Referring now to FIG. 3–4, a flow diagram of the operation of RRO checking module 368 of the RRO identification device of FIG. 3—3 is shown. At step 370, a servo field counter is initialized to zero at the beginning of the RRO checking process. At step 372, a current RRO value, RRO(k), corresponding to a servo field that is detected by the head at a current time step k is received from moving average filter 366. At step 374, a determination is made as to whether the absolute value of RRO(k) (|RRO(k)|) is less than the preset RRO threshold (Max RRO). If |RRO(k)| is greater than Max RRO, control is returned to step 370 where the counter is reset to zero and a next RRO value is received at step 372. If |RRO(K)| is less than Max RRO, the counter is incremented at step 376. If the counter value is found to be less than the total number of servo fields, p, at step 378, RRO retrieval continues at step 372. If the counter value is found to be equal to the number of servo fields, output 364 (see FIG. 3—3) instructs the ZAP process to move to the next track. Thus, the RRO checking module essentially determines that, if RRO values corresponding to p consecutive servo fields are all less than the present RRO threshold, the ZAP process can continue to the next track. The calculation and storing of RRO compensation values for the current track is typically carried out by the ZAP process before the process continues to the next track.

Figure 35:
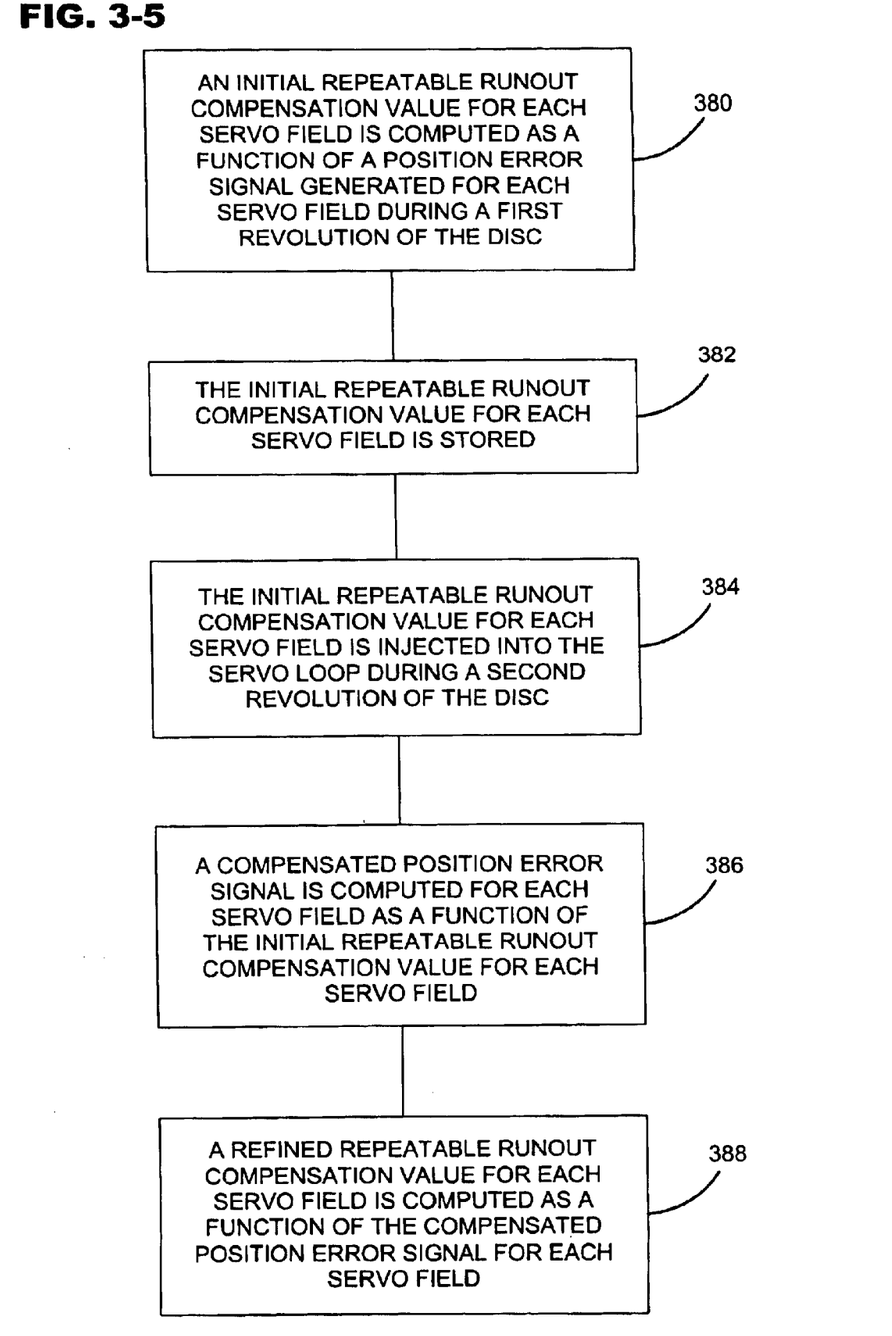

Referring now to FIG. 3–5, a flow diagram of another example ZAP process with which the RRO identification device of the present invention is useful is shown. At step 380, an initial RRO compensation value for each servo field of a track of the disc is computed as a function of a PES value generated for each servo field during a first revolution of the disc. At step 382, the initial RRO compensation value for each servo field is stored. At step 384, the initial RRO compensation value for each servo field is injected into the servo loop during a second revolution of the disc. At step 386, a compensated PES value for each servo field is computed as a function of the initial RRO compensation value for each servo field. At step 388, a refined RRO compensation value for each servo field is then computed as a function of the compensated PES value and the initial RRO compensation value (or the refined RRO compensation value computed during an immediately previous iteration) for each servo field. Steps 382, 384, 386 and 388 are repeated iteratively until the refined RRO compensation value for each servo field reaches a steady state RRO compensation value. A stored steady state RRO compensation value for each servo field is used to provide compensation during subsequent disc revolutions. Although this ZAP process computes RRO values in real-time, it does not carry out a real-time comparison of determined RRO values with an RRO threshold. Thus, the RRO identification device of the present invention can be employed in conjunction with this real-time ZAP process to perform a real-time comparison of the determined RRO values with the RRO threshold value to thereby compute the ZAP table in a relatively short period of time.

Figure 4:
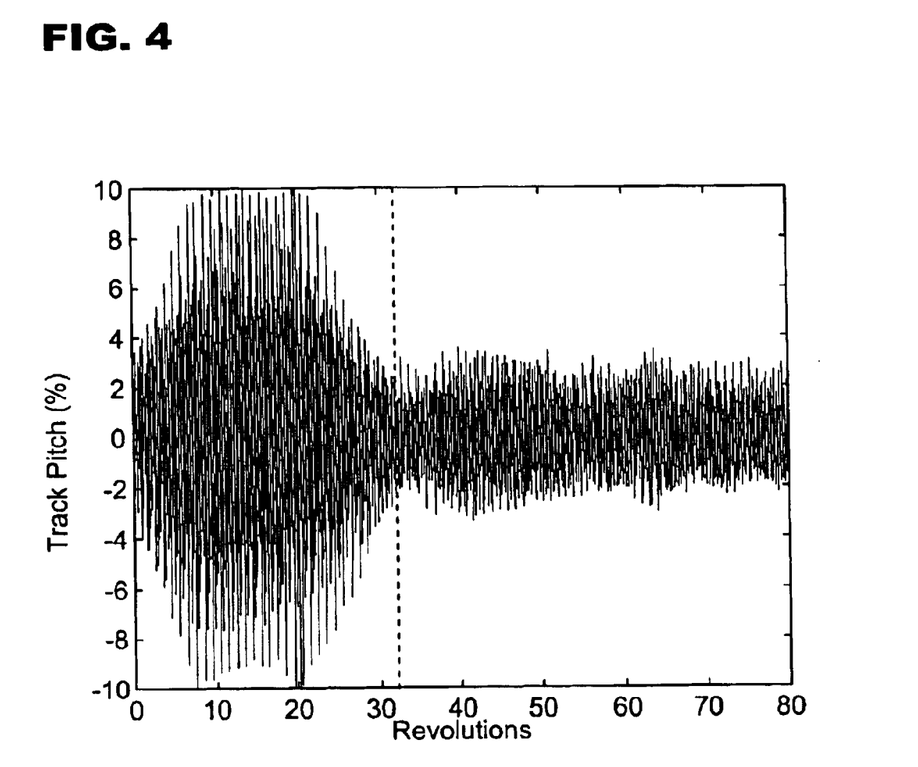
FIG. 4 is a plot showing the time history of real-time RRO measurements obtained by the moving average filter of the RRO identification device.
Figure 5:
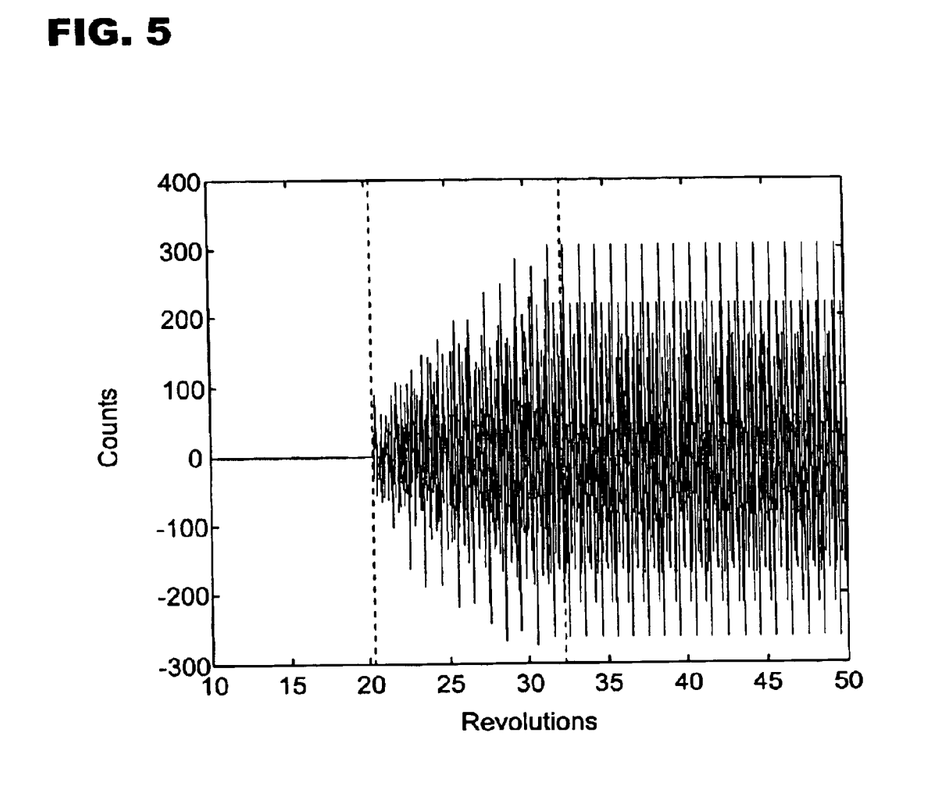
FIG. 5 is a plot showing the progress of the ZAP table.
Figure 6:
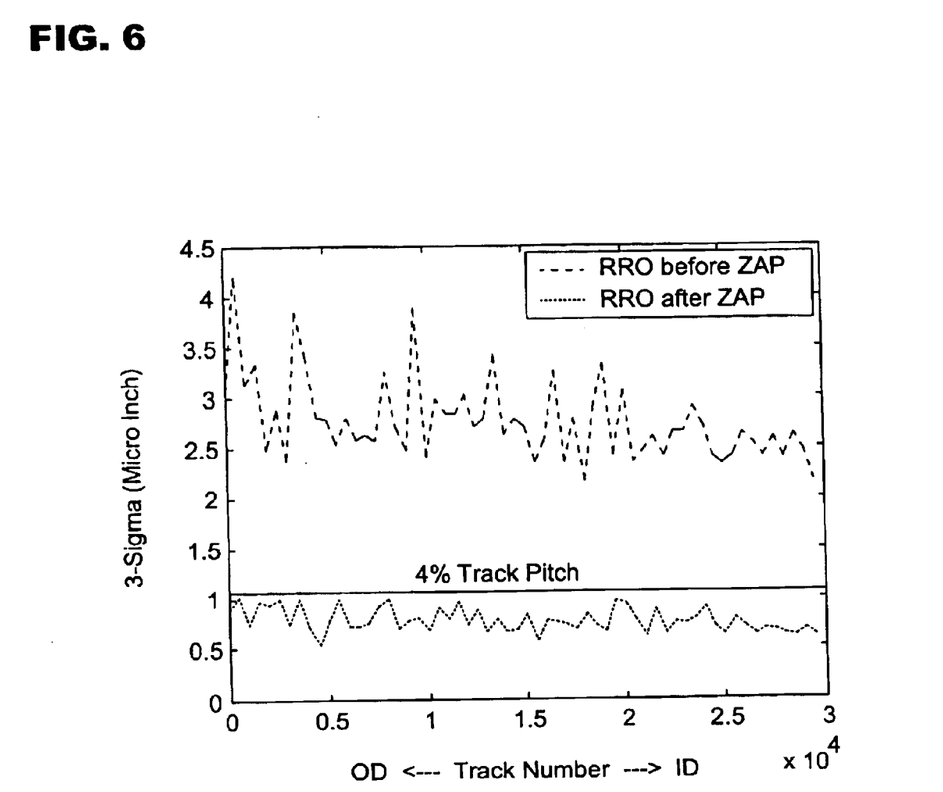
FIG. 6 is a plot showing the 3-σ measurements of RRO before and after the ZAP process.

The RRO identification device of the present invention, coupled to a ZAP process, was applied to a disc drive having 224 servo fields (p=224), a track pitch of 26.6 micro inches and an allowed maximum or threshold RRO value of 1.06 micro inches (4% of track pitch). The number of revolutions, n, for averaging PES values was selected to be equal to 7. Although the performance target was 4% of track pitch, a conservative threshold RRO value equal to 3% of track pitch was selected to take into account the effect of transient response when freezing the ZAP process. The ZAP process was performed at every 500 tracks of one head. FIG. 4 is a plot showing the time history of real-time RRO measurements obtained by the moving average filter of the RRO identification device. The ZAP process started approximately at revolution 20 and froze at revolution 33 because all 224 RRO values had passed the 3% track pitch threshold at revolution 33. The transient response slightly increased the RRO values, which were still lower than the 4% of track pitch performance target. FIG. 5 is a plot illustrating how the ZAP table was progressively populated with RRO compensation values. As can be seen in FIG. 5, the compensation values in the ZAP table were initially equal to zero. As the process progressed, the RRO compensation values grew until they reached values that caused the RRO values to be within the RRO threshold. After the ZAP process stopped, the compensation or ZAP table was stored and subsequently the same RRO compensation values were applied during a track following operation. FIG. 6 is a plot showing a comparison of 3-σ measurements of RRO performed at one head before the ZAP process was carried out (with no RRO compensation) and after the ZAP process (with RRO compensation). As can be seen in FIG. 6, the RRO values are all below the 4% track pitch threshold RRO value after the ZAP process was carried out. The average 3-σ improvements of all eight heads after the ZAP process was conducted were 63.6% reduction in RRO, 0.5% reduction in non-repeatable runout (NRRO), and 31.1% reduction in PES. The PES improvement was primarily due to the RRO reduction. In contrast with current ZAP processes which typically average about 20 revolutions per track, the ZAP process employing the RRO identification device of the present invention averaged only about 12 revolutions per track.

In summary, a repeatable runout identification device (such as 325) for use with a disc drive (such as 100) having a rotatable disc (such as 200) is provided. The repeatable runout identification device (such as 325) determines repeatable runout values for servo fields (such as 206, 208) of a first track (such as 204) of the disc (such as 200) as a function of received position error signal values for the servo fields (such as 206, 208) independent of averaging the position error signal values for each servo field (such as 206, 208). The repeatable runout identification device (such as 325) compares in real-time, each determined repeatable runout value for each servo field (such as 206, 208) with a threshold repeatable runout value.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo system while maintaining substantially the same functionality without departing from the scope and spirit of the present invention. In addition, although the preferred embodiment described herein is directed to a repeatable run-out identification system for detecting repeatable run-out in a disc drive, it will be appreciated by those skilled in the art that the teachings of the present invention can be applied to other servo tracking systems, without departing from the scope and spirit of the present invention. Further, the repeatable run-out identification scheme may be implemented in hardware or software. The disc drive can be based upon magnetic, optical, or other storage technologies and may or may not employ a flying slider.

What is claimed is:

1. A repeatable runout identification device for use with a disc drive having a rotatable disc, the repeatable runout identification device adapted to determine repeatable runout values for servo fields of a first track of the disc as a function of received position error signal values for the servo fields independent of averaging the position error signal values for each servo field, and adapted to compare, in real-time, each determined repeatable runout value for each servo field with a threshold repeatable runout value.

2. The apparatus of claim 1 further adapted to instruct a repeatable runout compensation process to advance to a next track of the disc if each determined repeatable runout value for each servo field is lower than the threshold repeatable runout value.

3. The apparatus of claim 2 wherein the repeatable runout compensation process is a batch-type Zero Acceleration Path process.

4. The apparatus of claim 2 wherein the repeatable runout compensation process is a real-time Zero Acceleration Path process.

5. The apparatus of claim 1 including a moving average filter that determines the repeatable runout values for the servo fields of the first track of the disc as a function of the received position error signal values for the servo fields.

6. The apparatus of claim 5 wherein the moving average filter determines the repeatable runout values for the servo fields of the first track as a convolution sum of the received position error signal values for the servo fields and a transfer function of the moving average filter.

7. The apparatus of claim 1 including a repeatable runout checking module that compares each determined repeatable runout value for each servo field with the threshold repeatable runout value.

8. The apparatus of claim 7 wherein the repeatable runout checking module comprises a counter that tracks the comparison of each determined repeatable runout value for each servo field with the threshold repeatable runout value.

9. The apparatus of claim 1 wherein the threshold repeatable runout value is a fraction of track pitch.

10. A method of identifying repeatable runout in a disc drive having a rotatable disc, the disc including a first track having servo fields, the method comprising:
(a) determining repeatable runout values for the servo fields of the first track of the disc as a function of the received position error signal values for the servo fields independent of averaging the position error signal values for each servo field; and
(b) comparing, in real-time, each determined repeatable runout value for each servo field with a threshold repeatable runout value.

11. The method of claim 10 further comprising (c) instructing a repeatable runout compensation process to advance to a next track of the disc if each determined repeatable runout value for each servo field is lower than the threshold repeatable runout value.

12. The method of claim 11 wherein the repeatable runout compensation process is a batch-type Zero Acceleration Path process.

13. The method of claim 11 wherein the repeatable runout compensation process is a real-time Zero Acceleration Path process.

14. The method of claim 10 wherein the determining step (a) is carried out by a moving average filter.

15. The method of claim 14 wherein the moving average filter determines the repeatable runout value for the servo fields of the first track as a convolution sum of the position error signal values for the servo fields and a transfer function of the moving average filter.

16. The method of claim 10 wherein the comparing step (b) is carried by a repeatable runout checking module.

17. The method of claim 16 wherein the repeatable runout checking module comprises a counter that tracks the comparison of each determined repeatable runout value for each servo field with the threshold repeatable runout value.

18. The method of claim 10 wherein the threshold repeatable runout value is a fraction of track pitch.

19. A repeatable runout identification device for use with a disc drive having a rotatable disc, the disc including a first track having servo fields, the repeatable runout identification device comprising:
an input adapted to receive position error signal values for the servo fields; and
processing means, coupled to the input, for determining repeatable runout values for the servo fields of the first track of the disc as a function of the received position error signal values for the servo fields independent of averaging the position error signal values for each servo field, and for comparing in real time, each determined repeatable runout value for each servo field with a threshold repeatable runout value.

20. The apparatus of claim 19 further comprising an output, coupled to the processing means, adapted to instruct a repeatable runout compensation process to advance to a next track of the disc if each determined repeatable runout value for each servo field is lower than the threshold repeatable runout value.

* * * * *